United States Patent
Xu et al.

(10) Patent No.: US 11,893,499 B2
(45) Date of Patent: Feb. 6, 2024

(54) DEEP FOREST MODEL DEVELOPMENT AND TRAINING

(71) Applicant: International Business Machines Corporation, Armonk, NY (US)

(72) Inventors: Jing Xu, Xian (CN); Rui Wang, Xian (CN); Xiao Ming Ma, Xi'an (CN); Ji Hui Yang, Beijing (CN); Xue Ying Zhang, Xi'an (CN); Jing James Xu, Xi'an (CN); Si Er Han, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 16/299,225

(22) Filed: Mar. 12, 2019

(65) Prior Publication Data

US 2020/0293906 A1  Sep. 17, 2020

(51) Int. Cl.
*G06N 5/01* (2023.01)
*G06N 20/20* (2019.01)

(52) U.S. Cl.
CPC ............... *G06N 5/01* (2023.01); *G06N 20/20* (2019.01)

(58) Field of Classification Search
CPC ............................... G06N 5/003; G06N 20/20
See application file for complete search history.

(56) References Cited

U.S. PATENT DOCUMENTS

| 2009/0281981 A1 | 11/2009 | Chen |
| 2016/0078625 A1 | 3/2016 | Tajbakhsh |
| 2018/0211380 A1 | 7/2018 | Tandon |
| 2019/0133482 A1 | 5/2019 | Viberg |
| 2019/0213685 A1* | 7/2019 | Ironside ............ G06N 20/00 |
| 2019/0303943 A1 | 10/2019 | Zhang |

FOREIGN PATENT DOCUMENTS

| CN | 103400391 A | 8/2016 |
| CN | 106156809 A | 11/2016 |
| CN | 106778836 A | 5/2017 |
| JP | 2016091306 A | 5/2016 |
| WO | 2005010492 A2 | 2/2005 |
| WO | 2012083274 A2 | 6/2012 |
| WO | 2020008919 A1 | 1/2020 |

(Continued)

OTHER PUBLICATIONS

Zhang, Youqiang, et al. "Cascaded random forest for hyperspectral image classification." IEEE journal of selected topics in applied earth observations and remote sensing 11.4 (2018): 1082-1094. (Year: 2018).*

(Continued)

*Primary Examiner* — Michael J Huntley
*Assistant Examiner* — Sehwan Kim
(74) *Attorney, Agent, or Firm* — David K. Mattheis (57) ABSTRACT

Automated development and training of deep forest models for analyzing data by growing a random forest of decision trees using data, determining Out-of-bag (OOB) predictions for the forest, appending the OOB predictions to the data set, and growing an additional forest using the data set including the appended OOB predictions, and combining the output of the additional forest, then utilizing the model to classify data outside the training data set.

25 Claims, 5 Drawing Sheets

(56) References Cited

FOREIGN PATENT DOCUMENTS

WO 2020086604 A1 4/2020

OTHER PUBLICATIONS

Aonpong, Panyanat, et al. "Combining a random forest algorithm and a level set method for land cover mapping." 2016 13th International Conference on Electrical Engineering/Electronics, Computer, Telecommunications and Information Technology (ECTI-CON). IEEE, 2016. (Year: 2016).*

Mishina, Yohei, et al. "Boosted random forest." IEICE Transactions on Information and Systems 98.9 (2015): 1630-1636. (Year : 2015).*

Watts, J. D., and R. L. Lawrence. "Merging random forest classification with an object-oriented approach for analysis of agricultural lands." The International Archives of the Photogrammetry, Remote Sensing and Spatial Information Sciences 37.B7 (2008): 2008. (Year: 2008).*

Miller, Kevin, et al. "Forward thinking: Building deep random forests." arXiv preprint arXiv:1705.07366 (2017). (Year: 2017).*

Fair, Ray C. "Methods for Computing Optimal Control Solutions: On the Solution of Optimal Control Problems as Maximization Problems." Annals of Economic and Social Measurement, vol. 3, No. 1. NBER, 1974. 135-154. (Year: 1974).*

Zhou, Zhi-Hua, and Ji Feng. "Deep Forest: Towards An Alternative to Deep Neural Networks." IJCAI. 2017. (Year: 2017).*

Breitenbach, Markus, Rodney Nielsen, and Gregory Z. Grudic. "Probabilistic random forests: Predicting data point specific misclassification probabilities." Univ. of Colorado at Boulder, Tech. Rep. CU-CS-954-03 (2003). (Year: 2003).*

Khan, Zardad, et al. "An ensemble of optimal trees for class membership probability estimation." Analysis of Large and Complex Data. Springer International Publishing, 2016. (Year: 2016).*

"Deep Forest Model Development and Training", International Application No. PCT/IB2020/051956, International filing date Mar. 6, 2020, 24 pages.

Patent Cooperation Treaty (PCT) Notification of Transmittal of the International Search Report and the Written Opinion of the International Searching Authority, or the Declaration, dated Jun. 15, 2020, International Application No. PCT/IB2020/051956, 9 pages.

Breiman, Leo, "Random Forests", Machine Learning, 45, 5-32, 2001, 28 pages, © 2001 Kluwer Academic Publishers.

Mell et al., "The NIST Definition of Cloud Computing", Recommendations of the National Institute of Standards and Technology, Special Publication 800-145, Sep. 2011, 7 pages.

Utkin, Lev V., "The Deep Forest and Its Modifications", Munich, Nov. 14, 2017, 66 pages, <https://www.statistik.uni-muenchen.de/institut/institutskolloquium/pdf_daten/WS1718/munich_2017.pdf>.

Wolpert, David H., "Stacked Generalization", Neural Networks, 5(2):241-260, 1992, Complex Systems Group, Theoretical Division, and Center for Non-linear Studies, MS B213, LANL, Los Alamos, NM, 87545, LA-UR-90-3460, 57 pages.

Xu, Ruo, "Improvements to Random Forest Methodology", 2013, Iowa State University, Graduate Theses and Dissertations, 88 pages, <https://lib.dr.iastate.edu/cgi/viewcontent.cgi?article=4059&context=etd>.

Zhou et al., "Deep Forest", arXiv: 1702.08835v3 [cs.LG] May 14, 2018, National Laboratory for Nevel Software Tehnology, Nanjing University, Nanjing 210023, China, 34 pages.

"Notice of Reasons for Refusal", Japanese Patent Application No. 2021-552716, Date of Drafting Reiwa 5 Aug. 30, 2023 3240 Five B00 Representative/Applicant Taisa, Tanekazu , Applied Provisions: Article 36 (6) (ii) (Clarity Requirement), 2 Pgs.

* cited by examiner

DEEP FOREST MODEL DEVELOPMENT AND TRAINING

BACKGROUND

The disclosure relates generally to systems and methods for developing and training models for analyzing data. The disclosure relates particularly to systems using deep random forests to automatically develop and train models to analyze data.

Deep learning is well known at least in part due to successful applications of deep neural networks, particularly in tasks involving image and speech information. Deep neural networks have deficiencies as well. Deep neural networks may require a large amount of data for training, which makes deep neural networks not quite suitable for small-scale data. Deep neural networks may be very complicated models which include too many hyper-parameters. Careful tuning of these parameters may be needed to reach a desired learning accuracy making the training of deep neural networks more like art, rather than science or engineering.

Zhou et. al. proposed a new deep learning method, gcForest (multi-Grained Cascade Forest) [Z.-H. Zhou and F. Ji. *Deep forest: towards an alternative to deep neural networks.* arXiv:1702.08835v2, 2017]. This method tries to realize the crucial deep learning idea, i.e., representation learning, by a cascade structure of random forests, where each layer of the cascade receives feature information created by the preceding layer, and outputs its results to the next layer. gcForest can achieve performance competitive to deep neural networks but with less of the aforementioned deficiencies.

Random forest was proposed by Breiman in 2001 [L. Breiman. Random forests. Machine Learning, 45(1):5-32, 2001]. It is an ensemble of decision trees. Special treatments are applied when growing these decision trees in the ensemble. First, each tree is grown on a bootstrap sample. The bootstrap sample is obtained by sampling with replacement from the training data and the sample size is equivalent with the size of training data. Second, each tree needs to grow fully on the sample until each leaf node contains only the same class of instances, and no pruning is required. More importantly, when splitting any node in the tree, it randomly selects a fraction of predictors, from which it chooses the one with the best gini value for split.

When scoring a data instance, random forest uses majority voting to combine the predictions from individual trees. For example, consider a target variable with 3 classes, c1, c2, and c3, and 1000 decision trees in the forest. Suppose that the numbers of votes for the 3 classes are 200, 300, and 500 respectively. Then, random forest will report a vector of class probabilities, i.e., [0.2, 0.3, 0.5], for the instance under scoring. A label prediction of c3 will also be reported since it has the maximal prediction probability.

If the instance is a training instance, random forest provides an option of generating Out-of-bag (OOB) prediction. Such a prediction is a result counted with the votes of trees which have not included the instance in their bootstrap samples. Continuing with the example above, if there are 400 trees which have not used the instance for training, and the numbers of votes for c1, c2, and c3 are 100, 100, and 200 respectively, the OOB prediction (probability vector) for the instance will be [0.25, 0.25, 0.50]. A label prediction will be c3 because it corresponds to the maximal probability. OOB accuracy is computed for the forest by comparing the instance labels with the OOB label predictions on the training data.

The method of gcForest uses cross-validation to generate new feature information. Though cross-validation is effective, it also brings challenges. First, the method of gcForest includes multiple random forest learners N in each layer, and it requires a k-fold cross-validation for each learner. Thus, a total of N*k learners is needed for each layer. When the data set is large, performance issues may arise since the number of learners increases with the size of the data set and it is expensive to build even a single learner. Very powerful computational facilities will be required. Second, training data may not be fully used due to cross-validation and the need for a validation data set derived from the training data set. The method of gcForest splits data into a training sample and a validation sample and stops training if the accuracy on the validation sample cannot be improved. The usage of the validation sample makes the small data issue even worse.

SUMMARY

Data may be analyzed by systems, methods and computer program products utilizing deep random forests having a reduced set of hyper parameters and reduced tuning requirements. In one aspect, a machine learning model is automatically constructed of layers of random forests. Decision trees for a random forest are grown from a data set. Out-of-bag (OOB) predictions and class label predictions are determined for the random forest. The OOB predictions for each instance of the data set are appended to the data set. The model is expanded by adding more layers of forests. Each new forest is grown from the appended version of the data set created by the previous layer. A combiner layer is added after the final data appending layer to produce the model output.

In one aspect computing resources may be reduced by using a method wherein the single user provided hyper parameter is the number of trees per forest. In this aspect, a machine learning model may be automatically constructed by receiving a training data set and a specified number of decision trees per random forest. The specified number of decision trees are then grown from the training data set. An OOB prediction and class label are determined for each instance of the training data set. The OOB prediction is appended to the training data for each instance and the appended data set is then used to create a next layer of forests. The OOB accuracy of each layer is determined using the OOB label prediction. Additional layers are added until the OOB accuracy ceases to significantly improve with additional layers. A combiner is added to consolidate the output of the last additional forest layer and provide the model output.

In one aspect, decision trees for a forest are grown from a training data set. The number of trees per forest and a class vector dimensionality, to be used in growing the trees are specified. One forest is provided per layer of the model having a plurality of layers, thereby reducing the computational resource needs for the categorization. An out-of-bag (OOB) prediction for the forest is determined. The OOB prediction is appended to the data set as a new feature for each data set instance. Appending the OOB prediction provides a means for adding new feature information from each layer to the succeeding layer without the use of models which may result in feature information being lost. An OOB accuracy is determined for the forest. Additional layers of a single forest are added by repeating the described steps and using the previous layer's appended data set for training until the new layer's OOB accuracy does not significantly improve. The use of OOB accuracy eliminates the need for cross-validation in the analysis, further reducing computation resources. The output of the last forest is combined, and the complete model is used to analyze data from outside the training data set.

DETAILED DESCRIPTION

Deep neural network (DNN) structures have been successfully applied to machine learning applications. DNNs may include a number of hyper-parameters and therefore may be difficult to tune to the problem and data set at hand. DNNs may also be difficult to apply to applications relating to small data sets as the DNN may require a large data set to train the model to an acceptable level of accuracy. The complexity and opacity of the operation of DNN structures may result in systems where it is difficult to determine the optimal structure in terms of layer number and nodes per layer necessary to achieve the desired or necessary accuracy without undue experimentation in developing or specifying the DNN structure. What is needed is a machine learning model structure which is applicable to even small data sets, can be easily specified and tuned without the effort associated with DNNs, and which can automatically complete model development when optimal accuracy has been achieved.

The disclosed systems, methods and computer products provide machine learning model development and training which is applicable to small data sets due to the use of bootstrapped training data sets selected with replacement from a provided training data set. Embodiments of the invention describe only a single hyper-parameter for model development—the number of random trees per forest. Embodiments of the invention provide for a simplified structure of a single random forest per layer and automatically stops model development when further improvements in accuracy are unlikely, resulting in an accurate model of relatively low computing complexity. In an embodiment, models having more than a single forest per layer may be created. Such forests require additional computational resources and may not demonstrate any significant improvement in model accuracy.

In an embodiment, a computer implemented method for developing and training models for analyzing data may begin with the development and construction of a machine learning model. The model may be used for classification or regression analysis. The model development arises from a training data set associated with the machine learning task for which the model is intended. The training data may be provided over a network, obtained locally from sensors, or provided via computer readable media.

The data may comprise numeric, text, audio, video, or image data. The data may be associated with location, speech, music, entertainment, healthcare, financial information, vehicle data, logistics data, sales data, or other data types relegated to machine learning analysis.

The number of random decision trees per forest required by the model must be specified. The number may be specified as a user input or may be set to a default quantity based upon previous model development efforts. In an embodiment, the number may be specified as five hundred trees. In an embodiment, the number may be randomly selected using a random number generator or a pseudo-random number generator. The number of trees per forest may remain constant as each layer/forest is added to the model. In an embodiment, the number of trees per forest may be varied for each layer/forest.

Each decision tree is grown from a bootstrapped data sample selected with replacement from the training data set. The bootstrapped sample is equivalent in size to the training data set. Selecting with replacement provides a way to grow the trees from the training data set while reducing the risk of overfitting the trees to the training data. As an example, for a training data set [1, 2, 3, 4, 5, 6] a bootstrapped sample selected with replacement may comprise [1, 2, 2, 3, 5, 6].

Each tree is fully grown from its respective bootstrapped sample until each node of the tree contains only the same class of instances and no pruning is required. As each tree is grown, a random selection of class predictors defines the split of tree nodes, with the fractional set having the lowest gini impurity value being used to define the node. The number of dimensions of the class vector may be specified as parameter for constructing the model or the model may be developed by considering a range of possible class vector dimension values. The gini impurity value reflects the likelihood that a data instance, chosen at random from the data set, would be incorrectly labeled. A gini impurity value of zero indicates a 0% probability of incorrect labeling of the instance indicating that all instances of the node are of the same class.

As an example, a training data set includes a thousand data instances each comprising four instance attributes, d, e, f and g, and a classification label c. In growing the tree, the system will evaluate the results of splitting the data at the root node using different combinations of instance attributes to divide the data set. The evaluation selects the combination of attributes having the lowest likelihood of incorrectly labeling a random data instance, i.e., the lowest class impurity. For the example, the root node is divided based upon the value of attribute d. Each possible value of attribute d, is defined as a branch from the root node, for example, attribute d has four different values, d1, d2, d3, and d4, so four branches would be defined from the root node. The evaluation process then proceeds for each node defined by the attribute d branches. Again, the attribute or combination of attributes which yield a data division least likely to incorrectly classify a random data instance is chosen to define the branches at each node. This selection may differ for each of the nodes defined by the original splitting of the data. For example, the combinations of: d1, e; d2, e; d3, f; and d4, g; define the next set of branches. This process is continued for each branch still containing more than a single class of labeled data while also having more than a minimum number of instances on the branch, the specified maximum number of node levels has not been reached, or the class impurity cannot be improved by another split.

In an embodiment, an Out-of-bag (OOB) prediction may be calculated for the forest of random trees. The OOB prediction constitutes a vector comprising dimensions derived from a summation of the votes for a particular training data set data instance by all random trees which did not have the particular instance as part of their bootstrapped data set. As an example, consider a forest having five hundred random decision trees analyzing data having three classes, c1, c2, and c3. In this example instance 1 of the training data was not a part of the bootstrapped data set for two hundred of the trees. Evaluation of instance 1 by those two hundred trees led to one hundred classifications as c1, and fifty classifications for each of c2 and c3. The OOB vector for the forest for instance 1 would be [0.5, 0.25, 0.25] where the three dimensions represent the probability of the classification being selected by the trees. An OOB label prediction for each instance is also determined as the highest probability class from the OOB prediction vector. For the example, the OOB label prediction would be c1.

In an embodiment, the OOB prediction class vector may be appended to the data instance as a new feature of the instance. In the example, instance 1 of the data set would have the vector [0.5, 0.25, 0.25] appended to the data instance as a new feature determined by the forest. The appended data set is then passed to the next layer of the model for use in growing the decision trees of that layer's single forest.

In an embodiment, an OOB accuracy for a forest/layer is also calculated. The OOB accuracy is calculated as a comparison of the OOB label prediction to the actual data label for labeled data. In the example, instance 1, labeled as c1 and having an OOB prediction of [0.5, 0.25, 0.25] has an OOB label prediction of c1, is labeled correctly. The OOB accuracy of the entire forest over the entire data set is calculated as the percentage of instances which are classified correctly by the label prediction.

In an embodiment, a second forest/layer is created using the appended data set output from the original layer as the new training data set. Each tree of the predetermined number of random trees for the second forest is grown from a bootstrapped data set, taken with replacement, from the appended training data set. OOB predictions are calculated for the new forest and further appended to the training data set. An OOB accuracy for the new forest is determined and compared to the OOB accuracy of the previous forest/layer of the model.

The iterative: forest creation, data appending, OOB prediction and OOB accuracy calculation, continues until the current layer OOB accuracy does not vary significantly from that of the preceding layer. In an embodiment, variation in the OOB accuracy of more than 0.005% is considered significant improvement.

In an embodiment, the output of the forest of each layer is appended to the data set such that each instance of the data set has a new feature added for each layer of the model used. In this embodiment, the addition of the new features to each data instance provides the new information about each instance to each succeeding layer, rather than condensing new information determined about the instances into a supplemental data model for succeeding layers. Such a supplemental model may result in the loss of feature information due to model fidelity issues as the model may smooth feature information across data instances rather than appending the specific new feature information to each instance.

After the addition of new forests fails to significantly improve the OOB accuracy, a combiner function is added to combine the output of the last layer. Another random forest may be used as the combiner, without the calculation of OOB predictions or OOB accuracy. In an embodiment, a gradient boosting function, such as XGBoost may be used as the function to combine the output of the final forest. The addition of the combiner exploits the additional feature appended to the data set by the final forest added to the model. Utilizing the model without the combiner would yield results without consideration of this final OOB predictor added to the data set and provide a lower accuracy of prediction. After the combiner has been added to the layer/forests, the model may be used for the intended purpose of analyzing data from beyond the training data set in a machine learning context.

Examples

In an embodiment, a machine learning model is constructed from a data set. A random forest of decision trees is grown from the data set. OOB predictions for the forest are determined and appended to the data set. An additional forest of decision trees is grown from the appended data set. A combiner is added to the model to combine the output of the additional forest and provide the model output.

In an embodiment, a training data set is received together with a specification for the number of decision trees per forest. A first random forest having the specified number of decision trees is grown from the data set. OOB predictions and class labels are determined using the random forest. The OOB predictions are appended to the training data set. An OOB accuracy of the forest is determined. An additional forest having the specified number of decision trees is grown from the appended data set. OOB predictions and class labels are determined for the additional forest. The OOB predictions are appended to the already-appended data set. The OOB accuracy of the additional forest is determined and compared to the original forest OOB accuracy. The process of growing a forest, determining OOB predictions, class labels and accuracy, appending the predictions to the data set and comparing the accuracy to that of the preceding forest continues until there is no significant (<0.005%) improvement in OOB accuracy due to the new forest. A combining structure is added to the last forest to provide the output of the model.

In an embodiment, a training data set is received together with a specification for the number of decision trees per forest and a class vector specification for the decision trees. A model is then constructed having a plurality of sequential layers. Each layer includes a single random forest to reduce computational resource requirements in constructing the model. A random forest having the specified number of decision trees is grown from the data set. OOB predictions and class labels are determined using the random forest. The OOB predictions are appended to the training data set. An OOB accuracy of the forest is determined. An additional forest having the specified number of decision trees is grown from the appended data set. OOB predictions and class labels are determined for the additional forest. The OOB predictions are appended to the already-appended data set. The OOB accuracy of the additional forest is determined and compared to the original forest OOB accuracy. The process of growing a forest, determining OOB predictions, class labels and accuracy, appending the predictions to the data set and comparing the accuracy to that of the preceding forest continues until there is no significant (<0.005%) improvement in OOB accuracy due to the new forest. A combining structure is added to the last forest to provide the output of the model.

Experimental Results

Embodiments of the invention were constructed and compared to standard: random forest, XGBoost, and gcforest models, using standard data sets. For the experiment, the number of trees per forest was specified as five hundred, the number of randomly selected attributes was √d (d is the number of data instance attributes) and each tree is grown to pure leaf nodes. The embodiments of the invention were constructed with each of a random forest and XGBoost combiner. For XGBoost, default setting were used. For GCForest, each layer consisted of four completely random forests and four regular random forests. A three-fold class vector was used for class vector generation.

Each data set was split into a training sample (50%) and a testing sample (50%). The training sample was used to train the model sand the testing sample was used to evaluate the trained models. Each model type was constructed, trained, and evaluated five times for each data set. The results are provided in Table 1 below. The embodiments of the invention are labeled Incremental Deep Forest (IDF) with random forest combiner, and IDF with XGBoost combiner. As illustrated in the table, the accuracy of the embodiments surpasses the accuracy of the known machine learning models I for most of the standard data sets evaluated.

TABLE 1

Model Accuracy (%)

| Data set | Random Forest | XGBoost | gcForest | IDF RF | IDF XGBoost |
|---|---|---|---|---|---|
| Hinselmann | 85.71 | 100.00 | 82.04 | 96.33 | 100.00 |
| Car Data | 94.79 | 94.10 | 95.72 | 96.76 | 96.64 |
| Cardiotocography | 88.62 | 88.98 | 86.85 | 89.14 | 89.80 |
| Splice | 96.22 | 96.07 | 97.02 | 96.42 | 96.46 |
| DNA | 96.31 | 96.83 | 96.73 | 97.01 | 97.10 |
| Frogs MFCCs genus | 97.67 | 97.00 | 98.14 | 98.31 | 98.38 |
| Frogs MFCCs species | 97.81 | 97.47 | 98.07 | 98.26 | 98.39 |
| Frogs MFCCs family | 98.28 | 97.65 | 98.36 | 98.51 | 98.61 |
| Ringnorm | 95.77 | 96.77 | 96.97 | 97.43 | 97.63 |
| Chess | 65.74 | 48.36 | 67.90 | 71.07 | 70.56 |
| Bank full | 90.52 | 90.43 | 90.27 | 90.55 | 90.75 |
| Connect 4 | 82.01 | 75.82 | 83.43 | 83.23 | 83.26 |

Figure 1:
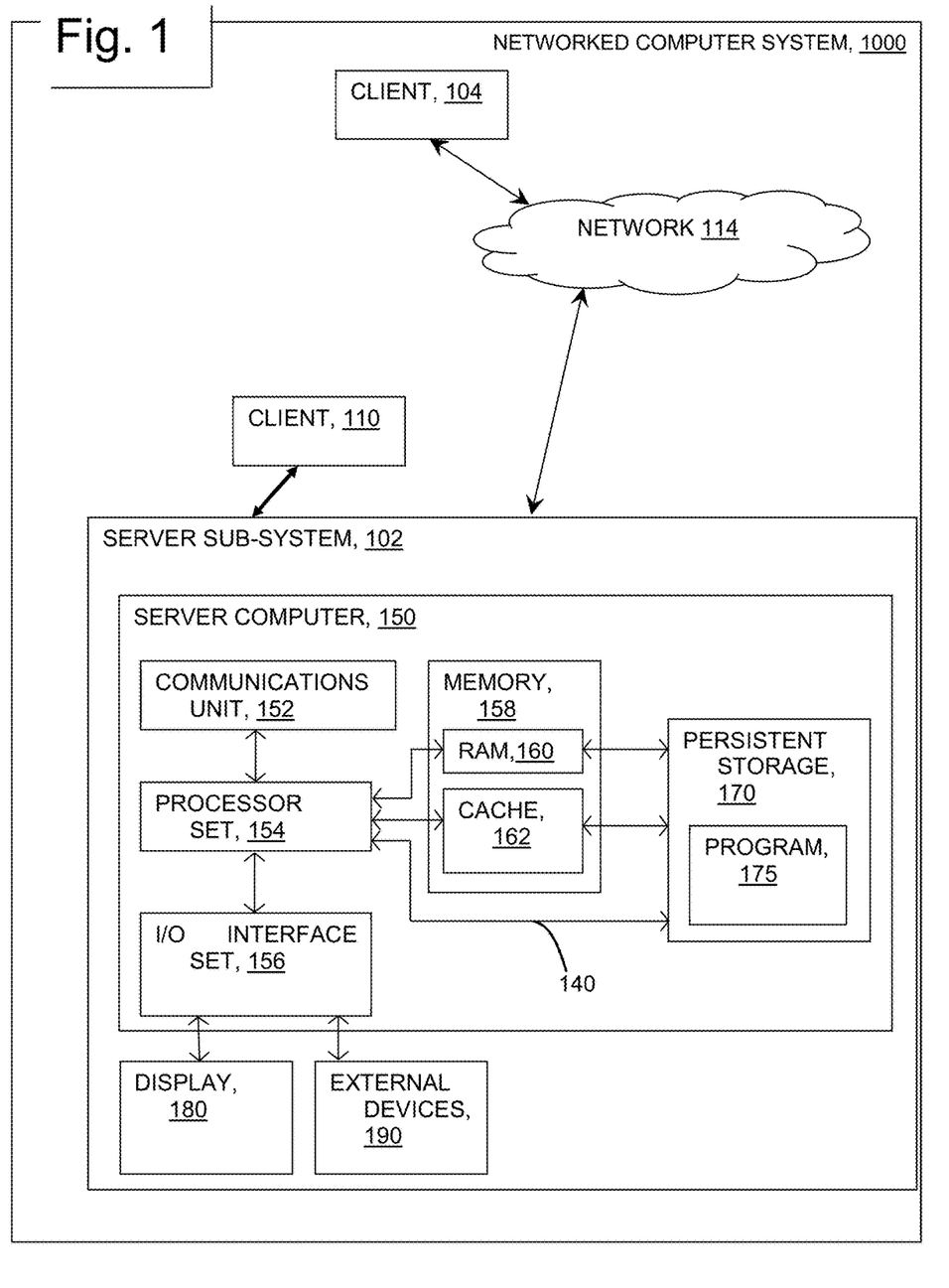
FIG. 1 provides a schematic illustration of a system, according to an embodiment of the invention.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise machine learning program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, cache 162, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory 160 (RAM). In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the machine learning program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., machine learning program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
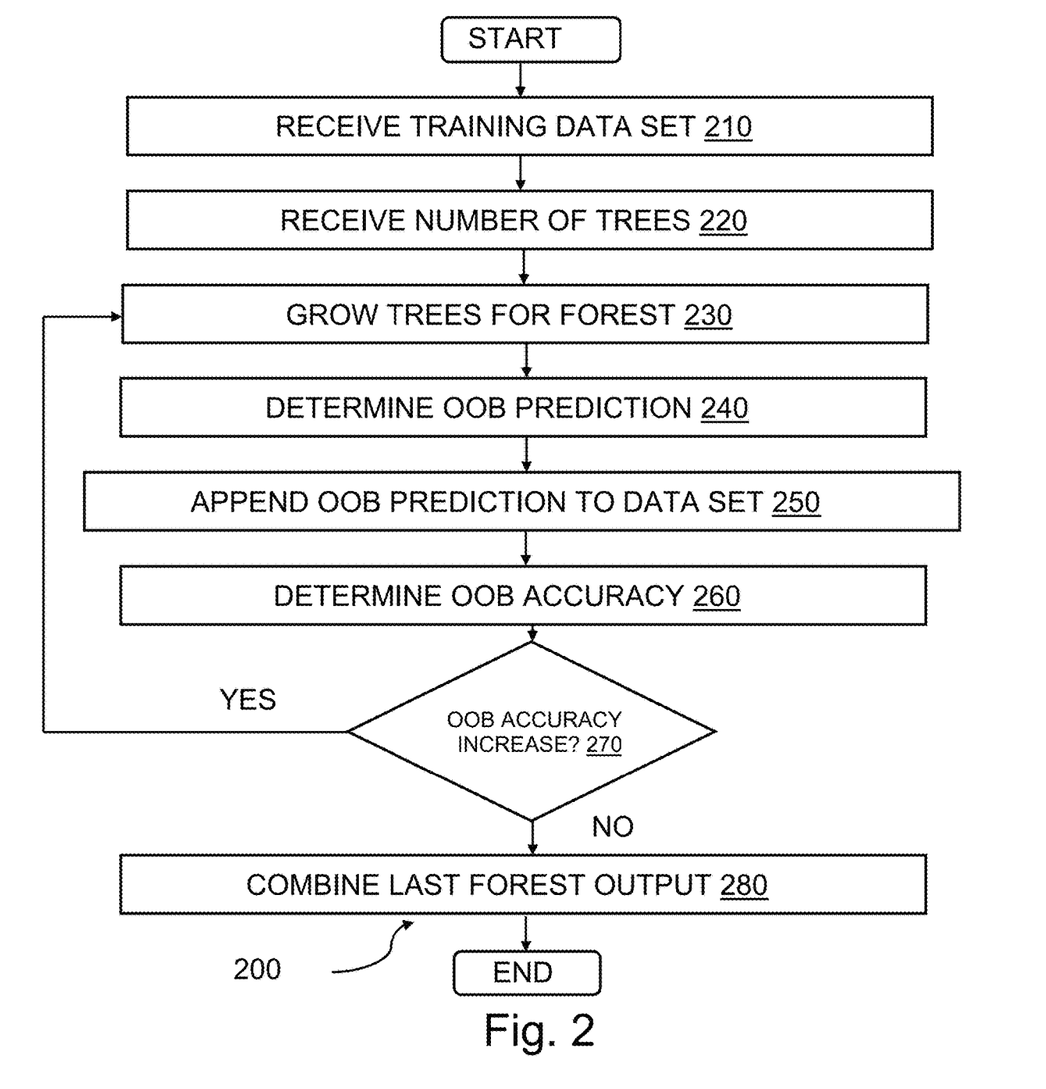
FIG. 2 provides a flowchart depicting an operational sequence, according to an embodiment of the invention.

FIG. 2 provides a flowchart 200, illustrating exemplary activities associated with the practice of embodiments of the invention. After program start, a training data set is received at 210. The training data set may comprise any form of data associated with the machine learning task for which the desired model is intended. Examples include numeric, character, audio, video and image data and combinations thereof. The number of random trees per forest is received at 220. The number may be chosen by a user, automatically determined according to a data set and the nature of the machine learning task, or randomly chosen using a random or pseudo-random number generator. The random trees are grown at 230. Each tree may be grown from a bootstrapped data sample equivalent in size to the training data set and selected with replacement from the training data set. The bootstrapped data may be selected without replacement and a set smaller than the training data may be used but these selections may reduce the accuracy of the completed model and lead to overfitting the model to the training data set. An Out-of-bag (OOB) prediction and label prediction for each instance of the training data are determined at 240. The OOB prediction provides new feature information about each instance of data and is appended to the respective instance of the data set at 250. An OOB accuracy is determined for the complete forest at 260. The OOB accuracy is calculated using the OOB label prediction for each instance and aggregating the correct predictions across the forest and across the training data set. The OOB accuracy is compared to the OOB accuracy from the previous layer of the model at 270. If there is significant (In an embodiment, improvement of >0.005% constitutes significant improvement) improvement in the OOB accuracy, the method returns to step 230 and another layer/forest is grown and added to the model. In an embodiment, after significant improvement, the method returns to step 220 and the number of trees in the new layer/forest may be determined and may differ from the previous layer/forest. If there is not significant improvement in the OOB accuracy, a combiner is added to the model at 280 to aggregate the output of the final layer/forest for use. The model of the method comprises only the number of forest/layers necessary to optimize the OOB accuracy. The model passes all new feature information (OOB predictions) to each subsequent layer such that no new feature information determined by the model is lost in the transfer.

Figure 3:
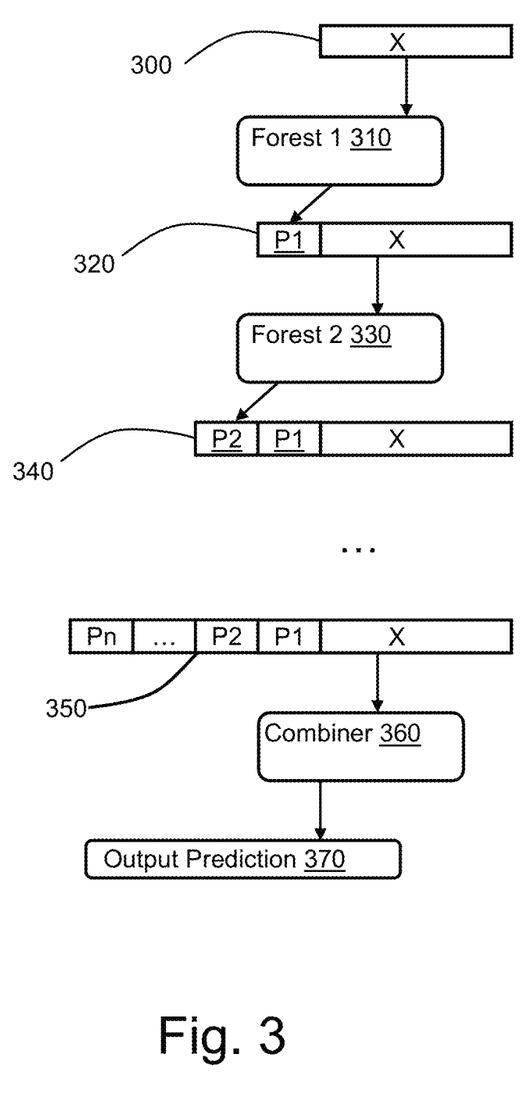
FIG. 3 depicts data flow, according to an embodiment of the invention.

FIG. 3 provides an illustration of the evolution of the training data set as the model is constructed. As shown in the figure, Data Set 300, comprising data instance X, is provided as an input to Forest 1 310. For each data instance of the Data Set 300, a class vector P1, is determined by Forest 1 310 for instance X, and appended instance X, yielding appended data set 320. The appended data set 320, is then provided as an input to Forest 2 330, which yields class vector P2 for instance X. Class vector P2, is appended to the instance yielding appended data set 340. This continues until the OOB accuracy of a new forest does not significantly improve over the previous forest. A combiner 360 is added to the model to aggregate the output of the last added forest, represented in the figure as appended data set 350 comprising all appended class vectors including the final class vector Pn. The output 370, of the combiner 360 constitutes the class prediction for a data instance.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
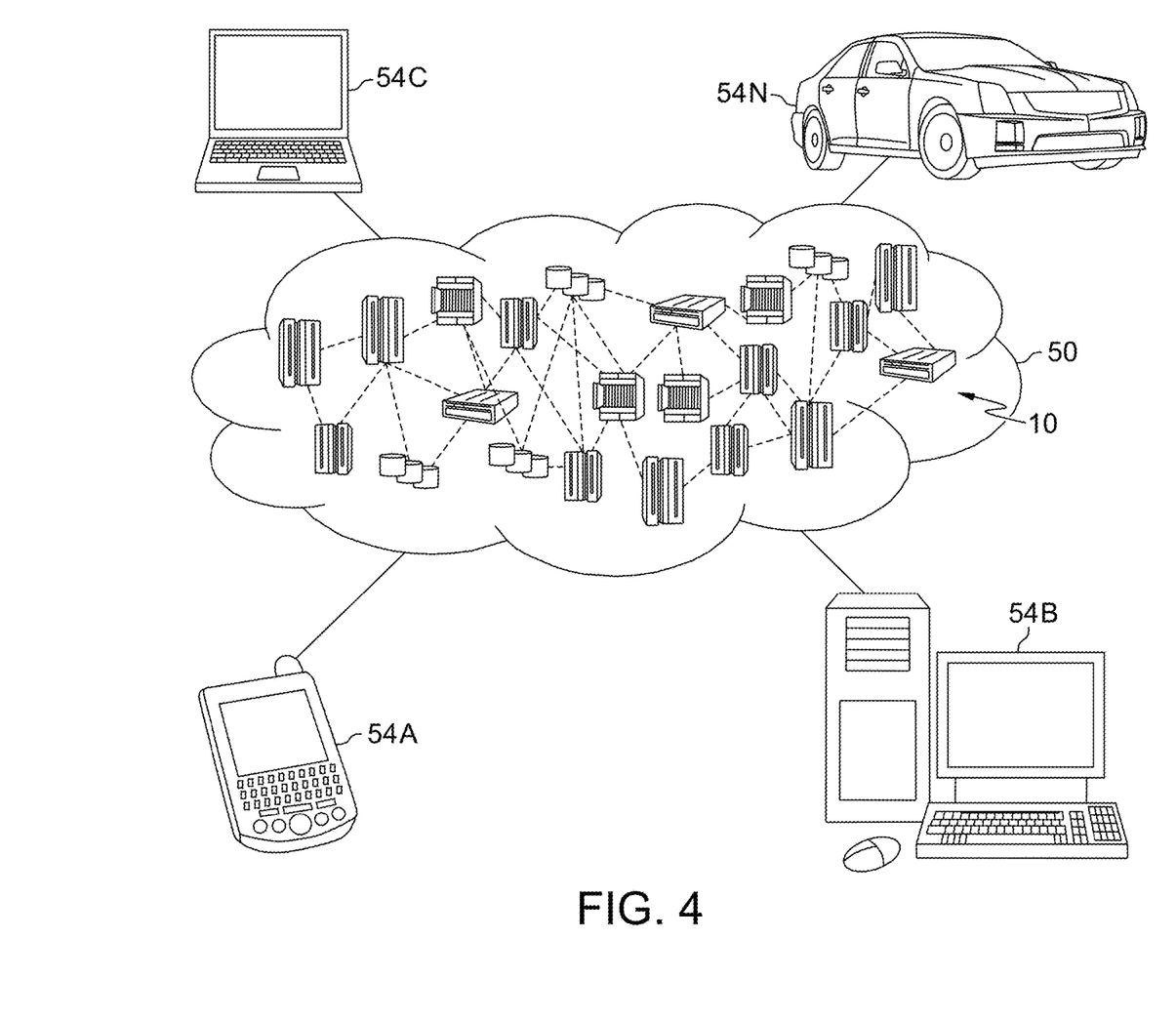
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
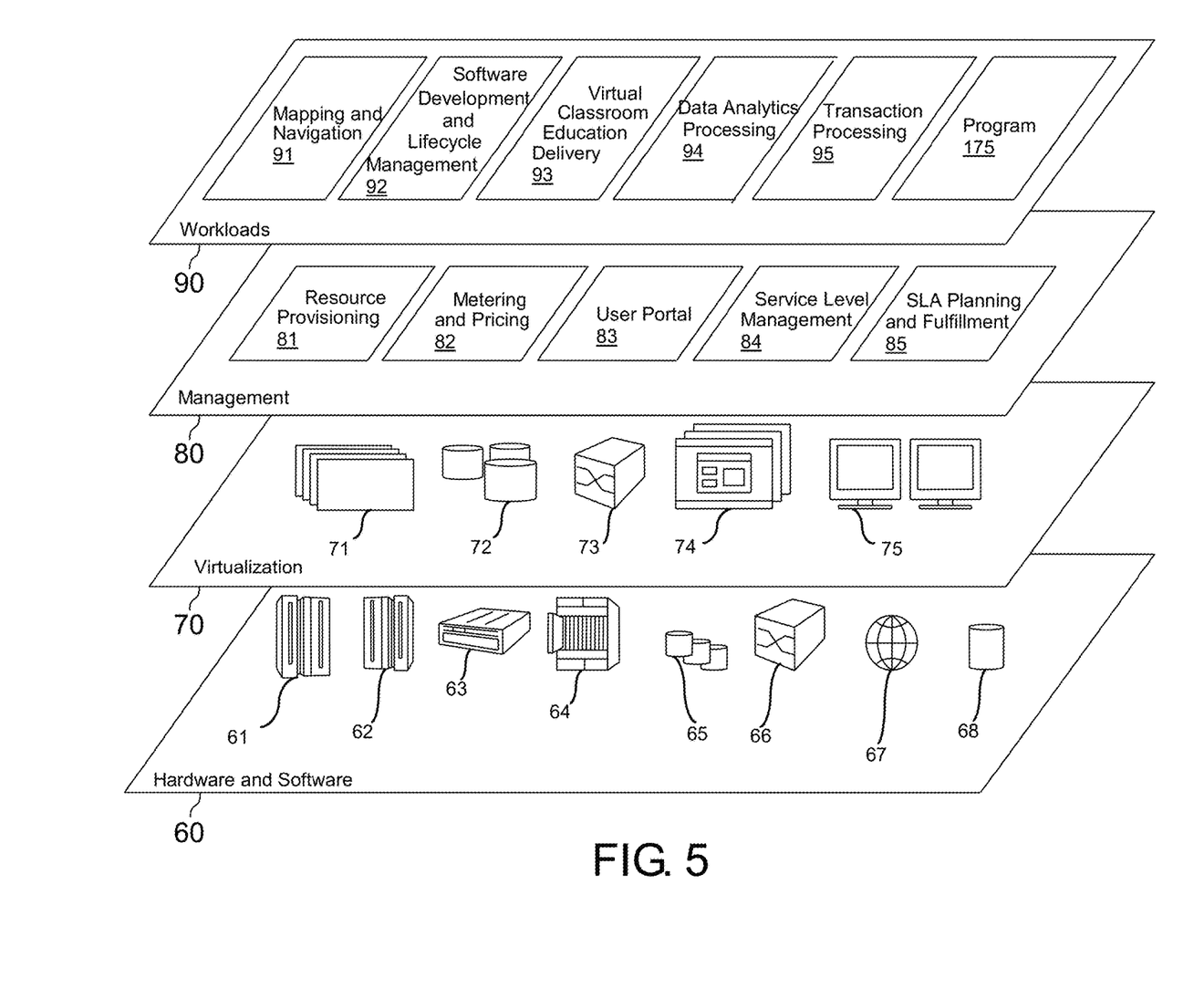
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for developing and training models for analyzing data, the method comprising:
    constructing a model by:
        growing, by one or more computer processors, a random forest of decision trees from a data set;
        determining, by the one or more computer processors, Out-of-bag (OOB) predictions for an instance of the data set for the random forest;
        appending the Out-of-bag predictions as a probability vector to the data set as new features represented in columns for the instance of the data set by the one or more computer processors;
        growing, by the one or more computer processors, an additional random forest using the data set with the appended OOB predictions; and
    combining an output of the additional random forest, by the one or more computer processors, with a combiner.

2. The computer implemented method according to claim 1 wherein each random forest is grown from data selected from a group consisting of: numeric, text, audio, video, image data location, speech, music, entertainment, healthcare, financial information, vehicle, logistics, and sales data.

3. The computer implemented method according to claim 1, wherein growing the random forest of decision trees using the data set comprises growing decision trees using a bootstrapped sample, taken with replacement from the data set, to grow each tree.

4. The computer implemented method according to claim 1 further comprising determining an OOB accuracy for each random forest layer and adding random forests until the OOB accuracy improves less than 0.005% from an OOB accuracy of a preceding layer.

5. The computer implemented method according to claim 1 wherein the combiner comprises a structure selected from a group consisting of: a random forest, and a gradient boosting structure.

6. The computer implemented method according to claim 1 wherein the model comprises a sequence of layers, each layer comprising a single random forest.

7. A computer program product for developing and training models for analyzing data, the computer program product comprising one or more computer readable storage media and program instructions stored on the one or more computer readable storage media, the program instructions comprising:
   programmed instructions for constructing a model by:
      providing a data set;
      growing a random forest of decision trees from the data set;
      determining Out-of-bag (OOB) predictions for an instance of the data set for the random forest;
      appending the Out-of-bag predictions as a probability vector to the data set as new features represented in columns for the instance of the data set;
      growing an additional random forest using the data set with the appended OOB predictions; and
   combining an output of the additional random forest with a combiner.

8. The computer program product according to claim 7, wherein providing the data set comprises providing a data set from a group consisting of: numeric, text, audio, video, image data location, speech, music, entertainment, healthcare, financial information, vehicle, logistics, and sales data.

9. The computer program product according to claim 7, wherein growing the random forest of decision trees comprises growing decision trees using a bootstrapped sample, taken with replacement, from the data set to grow each tree.

10. The computer program product according to claim 7, further comprising determining an OOB accuracy for each random forest layer and adding random forests until the OOB accuracy improves less than 0.005% from an OOB accuracy of a preceding layer.

11. The computer program product according to claim 7, wherein the combiner comprises a structure selected from a group consisting of: a random forest, and a gradient boosting structure.

12. The computer program product according to claim 7, wherein the model comprises a sequence of layers, each layer comprising a single random forest.

13. A computer system for developing and training models for analyzing data, the computer system comprising:
   one or more computer processors;
   one or more computer readable storage devices;
   program instructions stored on the one or more computer readable storage devices for execution by the one or more computer processors, the program instructions comprising:
      programmed instructions for constructing a model by:
         providing a data set;
         growing a random forest of decision trees from the data set;
         determining an Out-of-bag (OOB) predictions for an instance of the data set for the random forest;
         appending the Out-of-bag predictions as a probability vector to the data set as new features represented in columns for the instance of the data set;
         growing an additional random forest using the data set with the appended OOB predictions; and
      combining an output of the additional random forest with a combiner.

14. The computer system according to claim 13, wherein providing the data set comprises providing a data set from a group consisting of: numeric, text, audio, video, image data location, speech, music, entertainment, healthcare, financial information, vehicle, logistics, and sales data.

15. The computer system according to claim 13, wherein growing the random forest of decision trees comprises growing decision trees using a bootstrapped sample, taken with replacement, from the data set to grow each tree.

16. The computer system according to claim 13, further comprising determining an OOB accuracy for each random forest layer and adding random forests until the OOB accuracy improves less than 0.005% from an OOB accuracy of a preceding layer.

17. The computer system according to claim 13, wherein the combiner comprises a structure selected from a group consisting of: a random forest, and a gradient boosting structure.

18. The computer system according to claim 13, wherein the model comprises a sequence of layers, each layer comprising a single random forest.

19. A computer implemented method for developing and training models for analyzing data, the method comprising:
   constructing a model by:
      receiving, by one or more computer processors, a training data set;
      growing, by the one or more computer processors, a random forest of decision trees from the training data set;
      determining, by the one or more computer processors, Out-of-bag (OOB) predictions for an instance of the data set for the random forest;
      appending the Out-of-bag predictions as a probability vector to the training data set as new features represented in columns for the instance of the training data set by the one or more computer processors;
      determining, by the one or more computer processors, a first OOB accuracy for the random forest;
      growing, by the one or more computer processors, an additional random forest using the training data set with the appended OOB predictions;
      determining, by the one or more computer processors, a second OOB accuracy for the additional random forest;
      comparing, by the one or more computer processors, the first OOB accuracy of the random forest and the second OOB accuracy of the additional random forest; and
      combining an output of the additional random forest by the one or more computer processors with a combiner.

20. The computer implemented method according to claim 19 wherein each random forest is grown from data selected from a group consisting of: numeric, text, audio, video, image data location, speech, music, entertainment, healthcare, financial information, vehicle, logistics, and sales.

21. The computer implemented method according to claim 19, wherein growing the random forest of decision trees using the training data set comprises growing decision trees using a bootstrapped sample, taken with replacement from the training data set, to grow each tree.

22. The computer implemented method according to claim 19, wherein the model comprises a sequence of layers, each layer comprising a single random forest.

23. A computer implemented method for developing and training models for analyzing data, the method comprising:
constructing a model of sequential layers, each layer including a single random forest, by:
receiving, by one or more computer processors, a training data set;
receiving, by the one or more computer processors, a determined number of trees per forest and a class vector specification;
growing, by the one or more computer processors, the number of determined trees for a first forest using the training data set;
determining, by the one or more computer processors, first Out-of-bag (OOB) predictions for an instance of the data set for the first forest;
appending the first OOB predictions as a probability vector to the training data set as new features represented in columns for the instance of the data set by the one or more computer processors;
determining an OOB accuracy for the first forest by the one or more computer processors;
growing the number of determined trees for an additional forest using the training data set with the appended first OOB predictions by the one or more computer processors;
determining an additional OOB prediction for the additional forest by the one or more computer processors;
appending additional OOB predictions to the training data set by the one or more computer processors;
determining an additional OOB accuracy for the additional forest by the one or more computer processors;
adding forests, by the one or more computer processors, until the additional OOB accuracy does not improve; and
combining an output of the additional forest by the one or more computer processors.

24. The computer implemented method according to claim 23 wherein each random forest is grown from data selected from a group consisting of: numeric, text, audio, video, image data location, speech, music, entertainment, healthcare, financial information, vehicle, logistics, and sales data.

25. The computer implemented method according to claim 23, wherein growing the random forest of decision trees using the training data set comprises growing decision trees using a bootstrapped sample, taken with replacement from the training data set, to grow each tree.

* * * * *